(12) United States Patent
Kozlovsky et al.

(10) Patent No.: US 10,783,145 B2
(45) Date of Patent: Sep. 22, 2020

(54) BLOCK LEVEL DEDUPLICATION WITH BLOCK SIMILARITY

(71) Applicant: EMC IP Holding Company LLC, Hopkinton, MA (US)

(72) Inventors: Vitaly Stanislavovitch Kozlovsky, St. Petersburg (RU); Aleksandr Valentinovich Shadrin, St. Petersburg (RU); Inga Sergeyevna Petryaevskaya, St. Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 712 days.

(21) Appl. No.: 15/096,410

(22) Filed: Apr. 12, 2016

(65) Prior Publication Data

US 2017/0083581 A1 Mar. 23, 2017

(30) Foreign Application Priority Data

Sep. 23, 2015 (RU) .................................. 2015140625

(51) Int. Cl.
    *G06F 17/00* (2019.01)
    *G06F 16/2455* (2019.01)
    *G06F 16/2457* (2019.01)
    *G06F 16/174* (2019.01)

(52) U.S. Cl.
    CPC .... *G06F 16/24556* (2019.01); *G06F 16/1752* (2019.01); *G06F 16/24573* (2019.01)

(58) Field of Classification Search
    CPC ............. G06F 9/5066; G06F 17/30153; G06F 17/30525; G06F 17/30327; G06F 17/30569
    See application file for complete search history.

(56) References Cited

U.S. PATENT DOCUMENTS

| | | | | |
|---|---|---|---|---|
| 2014/0279952 | A1* | 9/2014 | Akirav | G06F 17/30156 707/692 |
| 2015/0293817 | A1* | 10/2015 | Subramanian | G06F 16/184 707/645 |
| 2016/0124665 | A1* | 5/2016 | Jain | G06F 3/0685 711/162 |

\* cited by examiner

*Primary Examiner* — Truong V Vo
(74) *Attorney, Agent, or Firm* — Ryan, Mason & Lewis, LLP (57) ABSTRACT

Methods and apparatus are provided for block similarity based block level deduplication of data. An exemplary method comprises obtaining a deduplicated dataset comprising a plurality of unique data chunks; determining a number of differences between two of the unique data chunks; evaluating whether the number of differences satisfies a predefined similarity criteria (e.g., that the number of bit differences cannot exceed a specified limit); and storing metadata for a first one of the two unique data chunks if the predefined similarity criteria is satisfied for the two unique data chunks, wherein the metadata comprises a pointer to a second one of the two unique data chunks and bit differences between the two unique data chunks. The bit differences comprise an executable code and/or a bit mask. The predefined similarity threshold is optionally a tunable parameter. The first one of the two unique data chunks can be restored by processing the metadata.

20 Claims, 10 Drawing Sheets

100

FILE A

FILE B

- 410 — OBTAIN DEDUPLICATED DATASET CONTAINING ONLY UNIQUE BLOCKS.
- 420 — CALCULATE DIFFERENCES BETWEEN SIMILAR CHUNKS IN THE POOL OF UNIQUE BLOCKS.
- 430 — ADD BLOCK DIFFERENCES (DELTAS) TO METADATA AND STORE IN SEPARATE POOL, NAMED DIFFERENCE STORE.
- 440 — RESTORE ORIGINAL BLOCK USING METADATA FROM A SIMILAR BLOCK.

*FIG. 6A*

```
typedef struct UniqueBlock{
    unsigned int   _size;
    void*          _ptr;
}UniqueBlock;

typedef struct DiffOps{
//depending on the implementation this part might contain class with functions or just a bit mask
    char*          _diff;
    unsigned int   _shift;
    unsigned int   _diffLen;
}DiffOps;

typedef struct DiffBlock{
    void*          _ptrToSimilar;
    DiffOps        _diff;
}DiffBlock;

//helper structure keeping pointers of file containing 100 atomic blocks
void* fileMap[100];
//unique blocks pool
UniqueBlock  uniquePool[SIZE_OF_UNIQUE_POOL];
//differences pool
DiffBlock    diffsPool[SIZE_OF_DIFFS_POOL];
```

```
void* getOriginalFileAsBuffer(void* _fileMap, int _fileMapLen, void* _fileBuffer){
    //go over all the file map
    for (int i=0; i< _fileMapLen; ++i){
        //check if the referenced block belongs to the pool of unique blocks
        if ((&uniquePool[0] <= _fileMap[i])&&
            (_fileMap[i]< &uniquePool[SIZE_OF_UNIQUE_POOL])){
            memcpy(_fileBuffer,_fileMap[i], getBlockSize(_fileMap[i]));
            _fileBuffer+=getBlockSize(_fileMap[i]);
        }else //check if the referenced block required to restore a block from similar
        if ((&diffsPool[0] <= _fileMap[i])&&
            (_fileMap[i]< &diffsPool[SIZE_OF_DIFFS_POOL])){
            void* _similar = ((DiffBlock*)_fileMap[i])-> _ptrToSimilar;
            memcpy(_fileBuffer,_similar, getBlockSize(_similar));
            applyDiff(_fileBuffer,((DiffBlock*)_fileMap[i])-> _diff);
            _fileBuffer+=getBlockSize(_similar);
        }else
            return 0; //error
    }
    return _fileBuffer;
}
```

```
restoreBlockFromSimilar(_fileBuffer,_similar,,((DiffBlock*)_fileMap[i])->_diff)

void* restoreBlockFromSimilar(void* _fileBuffer,UniqueBlock* _original, DiffOps* _p_diffs){
    void* _restored = _fileBuffer;
    if (!_restored)
        _restored = malloc(_original->_size);
    memcpy(_restored, _original, _original->_size);
    // in this example, suppose that the chain of differences contains blocks but not operations
    // suppose that when the block was encoded, the value _shift < 0 was assigned to designate the list end
    while(_p_diffs->_shift >= 0){
        memcpy(_restored + _p_diffs->_shift, _p_diffs->_diff,_p_diffs->_diffLen);
        _p_diffs++;
    }
    return _restored;
}
```

```
10011001 11010111 10010000 11110101 11110101
```
UNIQUE BLOCK 710 shift1= 16; value1=0b01100000
shift2= 32; value1=0b01100100

MASK 720

```
10011001 11010111 01100000 11110101 01100100
```
RESTORED BLOCK 730

FIG. 8

```
void* restoreBlockFromSimilar(UniqueBlock* _original, DiffOps* _p_diffs){
  void* _restored = malloc(_original-> _size);
  memcpy(_restored,_original,_original-> _size);

while (_p_diffs-> _shift >= 0){
    memcpy(_restored + _p_diffs-> _shift, _p_diffs-> _diff, _p_diffs-> _diffLen);
    _p_diffs++;
  }
  return _restored;
}
```
�ణ 800

BLOCK LEVEL DEDUPLICATION WITH BLOCK SIMILARITY

FIELD

The field relates generally to data deduplication.

BACKGROUND

Deduplication is a common technique to reduce redundant data by eliminating duplicate copies of repeating data. Deduplication improves storage utilization and reduces the number of bytes that must be sent over a network. Typically, unique data chunks are identified and stored as "fingerprints" during an analysis process. As the analysis progresses, other chunks are compared to the stored copy and when a match is detected, the redundant chunk is replaced with a reference that points to the stored chunk.

Depending on the granularity of the logical piece of data that is considered to be unique, deduplication might be applied to files, records, objects or blocks. Advanced deduplication algorithms allow the storage of unique blocks only once, referred to as block level deduplication. Bigger data chunks are composed from unique blocks by a restoration procedure on a read request operation. The goal of each deduplication algorithm is the maximal elimination of the redundancy with minimal overhead.

The efficiency of a deduplication algorithm is measured by a deduplication ratio (e.g., a ratio of an amount of user data to data saved on storage) and performance (e.g., an amount of central processing unit (CPU) cycles, input/output (I/O) impact and/or bus overhead on the algorithm execution). In many cases, both the deduplication ratio and performance characteristics are important. In some cases, however, one of the characteristics might be critical.

A need remains for block level deduplication techniques with improved storage space savings. A further need exists for block level deduplication techniques that increase the percentage of deduplicated data with an acceptable impact on system performance.

SUMMARY

Illustrative embodiments of the present invention provide methods and apparatus for block similarity based block level deduplication of data. In one exemplary embodiment, a method comprises the steps of obtaining a deduplicated dataset comprising a plurality of unique data chunks; determining a number of differences between two of the unique data chunks; evaluating whether the number of differences satisfies a predefined similarity criteria (e.g., that the number of bit differences cannot exceed a specified limit); and storing metadata for a first one of the two unique data chunks if the predefined similarity criteria is satisfied for the two unique data chunks, wherein the metadata comprises a pointer to a second one of the two unique data chunks and bit differences between the two unique data chunks.

In at least one embodiment, the number of differences between two of the unique data chunks is determined by processing a fingerprint representation of the two unique data chunks to identify the differences. In one or more exemplary embodiments, the bit differences comprise an executable code and/or a bit mask. The predefined similarity threshold is optionally a tunable parameter. The first one of the two unique data chunks can be restored by processing the metadata.

Advantageously, illustrative embodiments of the invention provide improved block similarity based block level deduplication of data. These and other features and advantages of the present invention will become more readily apparent from the accompanying drawings and the following detailed description.

DETAILED DESCRIPTION

Illustrative embodiments of the present invention will be described herein with reference to exemplary communication, storage and processing devices. It is to be appreciated, however, that the invention is not restricted to use with the particular illustrative configurations shown. Aspects of the invention provide methods and apparatus for block level deduplication that employ a block similarity approach to increase the percentage of deduplicated data with an acceptable impact on system performance. In this manner, more duplicated data is eliminated on storage.

One or more exemplary embodiments process a fingerprint representation of a given chunk to determine if a predefined similarity criteria is satisfied. For example, the fingerprint representation of two respective chunks (e.g., a unique chunk and a compared chunk) can be compared to identify differences. In one exemplary embodiment, the differences between the two respective chunks is compared to a predefined similarity threshold. For example, the predefined similarity threshold may require that a number of bit differences within a predefined number of positions of each chunk cannot exceed a specified limit. Depending on the result of the threshold test, a new block might be classified as "unique" (e.g., if the differences exceed the predefined similarity threshold) or "similar" (e.g., if the differences do not exceed the predefined similarity threshold). The predefined similarity threshold that defines a similar block is optionally a tunable parameter.

Existing block level deduplication approaches employ a chunker algorithm that defines the reasonable piece of data that should be considered as atomic. The chunker algorithm splits incoming non-deduplicated data into atomic blocks. Depending on the particular chunker algorithm, the size of the block might be fixed (e.g., 8 Kbytes, 16 Kbytes or 512 Kbytes) or dynamically varied based on one or more assumptions. Each atomic block of user data is verified for uniqueness. If the same block is not found in the pool of unique blocks, a new unique block is added to the pool. To keep the initial user data logic, meta-information is kept. Generally, each big chunk of user data (for example, a file or its part) is represented by a table of references to the pool of unique blocks.

For a more detailed discussion of existing block level deduplication approaches, see for example, Joe Colucci and Kay Benaroch, Demystifying Deduplication, Dell Power Solutions, Issue 1 (Dell, 2010), incorporated by reference herein.

Each read request to the user data is handled by a restore algorithm. The restore algorithm goes over the table by pointers, withdrawing atomic blocks one-by-one from the unique pool and joining them in the buffer. Once the requested block of user data is restored, the read request can be considered satisfied.

The restore algorithm should be non-invasive. In other words, the restore algorithm should operate effectively to bring minimal delays to I/O. There might be different options for the schedule and the presence of the deduplication in the I/O path. For example, the restore algorithm may be implemented using an inline deduplication option (where incoming data stream is deduplicated), an online deduplication option (where data is subject to deduplication once the data arrives to storage), or an offline deduplication option (where deduplication is performed according to some schedule).

Figure 1:
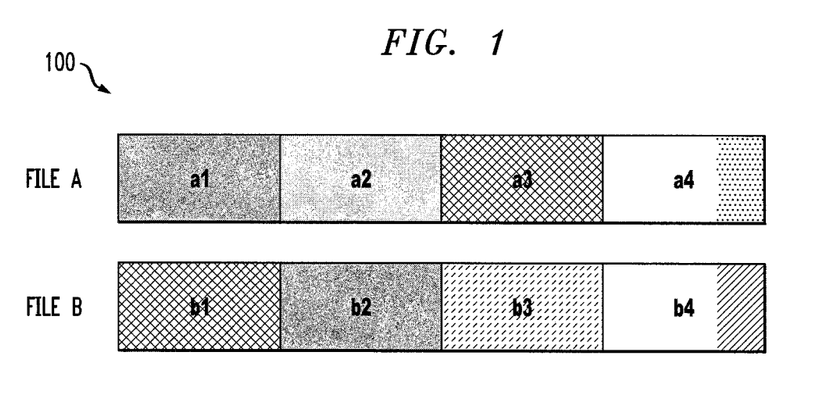
FIG. 1 illustrates an exemplary chunker process that splits two blocks of user data into atomic blocks.

FIG. 1 illustrates a chunker process 100 that splits two blocks of user data (for example, portions of two files A and B) into atomic blocks a1, a2 . . . a4 and b1, . . . b4. For ease of illustration, assume that a fixed block chunker algorithm is applied to the blocks of FIG. 1, where the same hash pattern designates the same content of the block. A deduplication algorithm will eliminate duplicates of blocks a1 and b2, as well as a3 and b1, in a known manner.

Note that block b4 is similar to block a4, but the granularity of the chunker process 100 applied in FIG. 1 does not detect this similarity and does not eliminate the duplicate. In particular, portions of blocks a4 and b4 are identical and the other parts are different.

For example, consider a block A having a binary pattern 10001001111 and a block B having a binary pattern 10001001010. The last three positions are different, while the rest of the two blocks are the same. If block A is labeled as unique, then block B is similar to A.

Aspects of the present invention recognize that the number of such blocks in a given system might be significant, depending on the nature of the data.

One might argue that if the minimal block size in FIG. 1 matched the leading portion of block b4 (i.e., the portion without any hashing) then the problem would be solved. The smaller the block size, however, the larger the structure that keeps track of the unique blocks in the system, impacting performance. This structure is the part of meta-information, referred to as the block index. The block index should be kept in random access memory (RAM), avoiding swapping, to ensure minimal delays on the deduplication process and recovery.

Another problem related to the granularity minimization is the excessive I/O impact. If the atomic block size is less than the application I/O size, then the load on the disk array could be dramatically increased.

Figure 2:
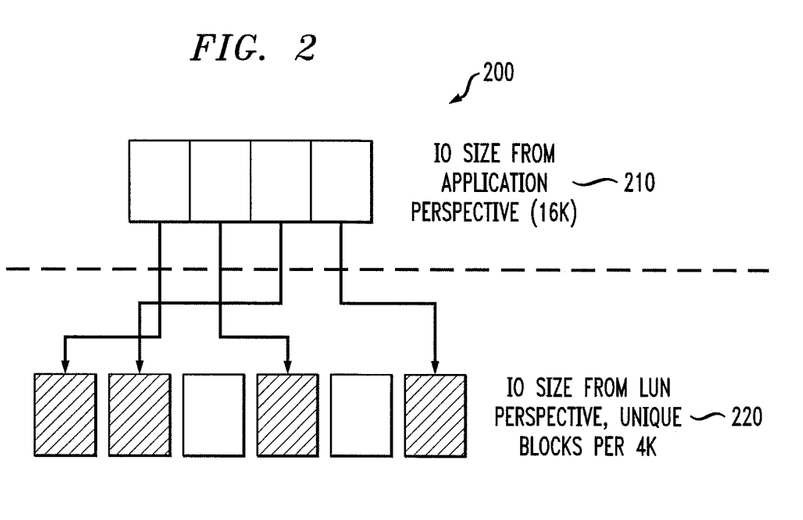
FIG. 2 illustrates an I/O transformation process associated with a block restore process.

FIG. 2 illustrates an I/O transformation process 200 associated with a block restore process. As shown in FIG. 2, an I/O size 210 from the perspective of an application might be, for example, 16 Kbytes, while the I/O size 220 from the perspective of a logical storage unit, identified by a logical unit number (LUN), might be, for example, unique blocks for each 4 Kbytes of user data. As shown in FIG. 2, to restore the exemplary block of 16 Kbytes at least four reads must be performed if the minimal atomic size is 4 Kbytes, while if the minimal atomic size was 16 Kbytes, the read request would be satisfied by a single read operation from the storage system.

Figure 3:
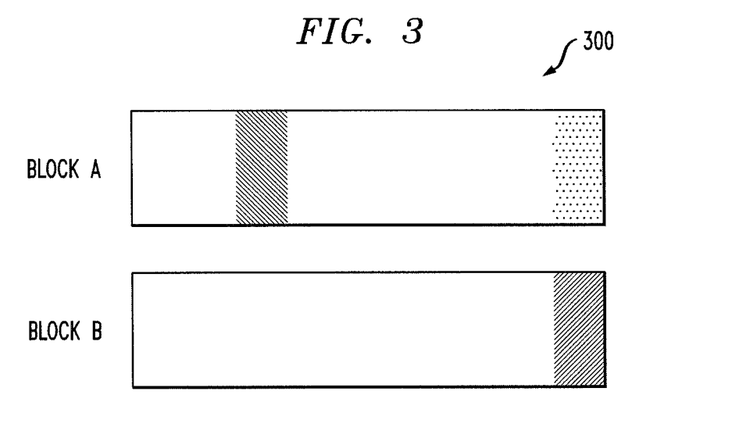
FIG. 3 illustrates two blocks of user data processed by an exemplary deduplication process.

FIG. 3 illustrates two blocks A and B of user data. Consider an exemplary two-pass deduplication process 300. A first pass is performed on blocks A and B with a general deduplication technique and a second pass is applied only on unique blocks, chunking them into smaller parts. Then, a gain might be achieved even without a significant growth of the block index. This approach, however, will consider blocks A and B to be different, even though they have some similar portions.

Figure 4:
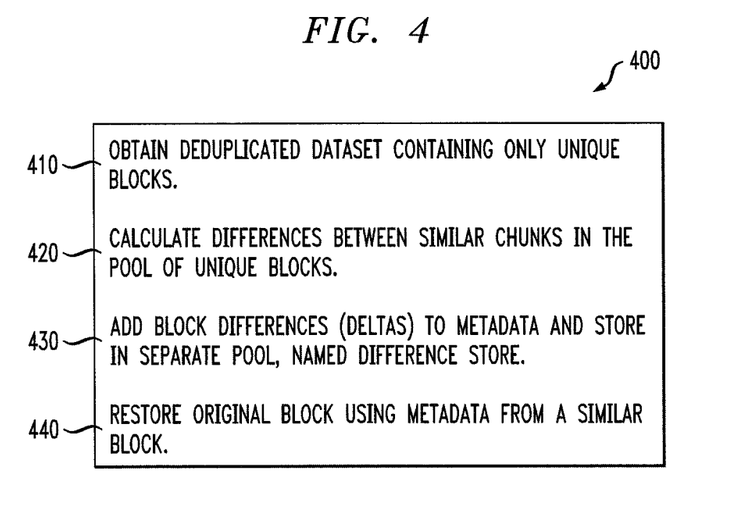
FIG. 4 is a flow chart illustrating an exemplary implementation of a deduplication process in accordance with an embodiment of the invention.

FIG. 4 is a flow chart illustrating an exemplary implementation of a deduplication process 400 in accordance with an embodiment of the invention. The processing of an exemplary original file by the exemplary deduplication process 400 is discussed further below in conjunction with FIG. 5. It is noted that the exemplary deduplication process 400 can be considered as addition or enhancement to one or more existing deduplication algorithms or it can be applied as a base deduplication algorithm by itself. For ease of illustration, assume that a conventional deduplication algorithm has deduplicated a dataset and only unique blocks remain.

As shown in FIG. 4, a deduplicated dataset containing only unique blocks is obtained during step 410. Thereafter, the exemplary deduplication process 400 calculates differences between similar chunks in the pool of unique blocks during step 420.

The block differences (deltas) are added to the metadata during step 430 and stored in a separate pool referred to as a difference store. Depending on a particular implementation, the block differences might be implemented, for example, as bit masks or algorithmic macro functions. As discussed further below, the metadata contains a pointer to the similar block(s) and allows the original block to be restored during step 440 from the similar block(s).

Figure 5:
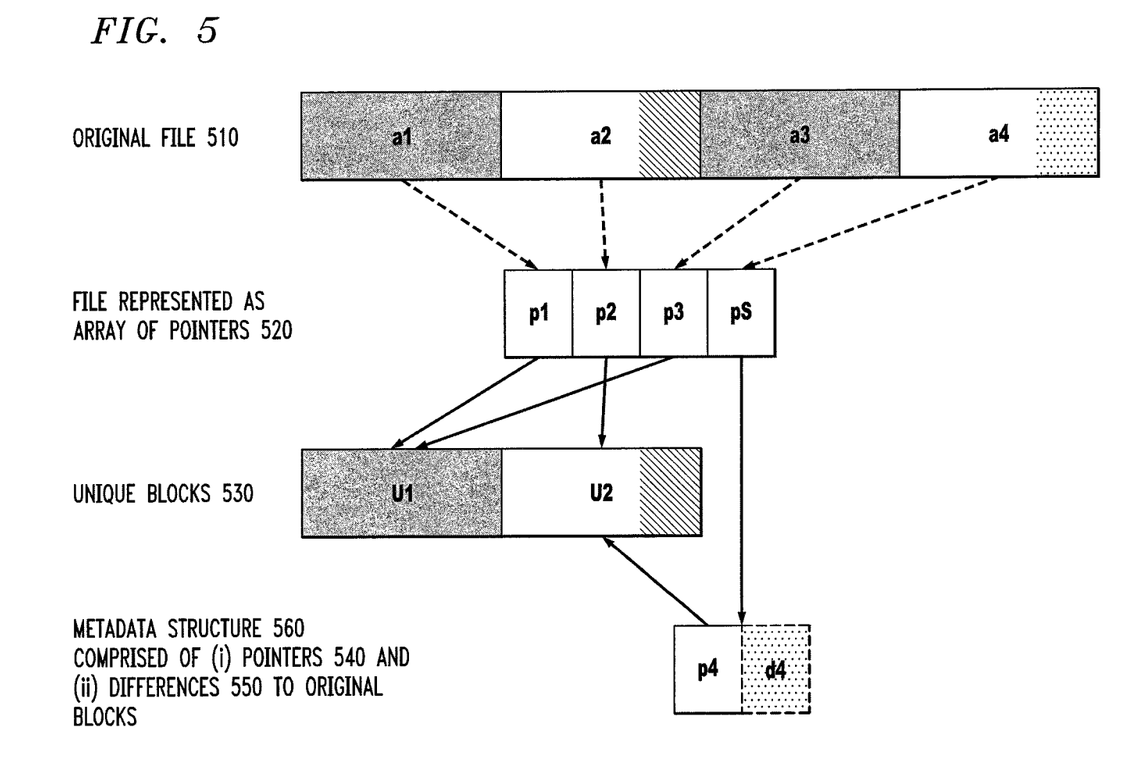
FIG. 5 illustrates an exemplary original file that is processed by the exemplary deduplication process of FIG. 4.

FIG. 5 illustrates an exemplary original file 510 that is processed by the exemplary deduplication process 400 of FIG. 4. FIG. 5 illustrates how the content of the original file 510 is mapped to the structures used by the exemplary deduplication algorithm 400 of FIG. 4. The original file 510 is represented by an array of pointers 520 that point to the unique blocks 530 of the original file 510. The number of pointers in the array 520 is equal to the number of unique blocks 530 into which the original file 510 is split.

As discussed further below in conjunction with FIGS. 6A and 6B, once a real block needs to be restored, a restore algorithm using a pointer from the array 520 to the pool of unique blocks 530 returns the corresponding block.

Note that block a2 is similar to block a4. In particular, portions of blocks a2 and a4 are identical and the other parts are different. For example, consider a block a2 having a binary pattern 10001001111 and a block a4 having a binary pattern 10001001010. The last three positions are different, while the rest of the two blocks are the same. Aspects of the present invention recognize that if block a2 is labeled as unique, then block a4 is similar to A.

In at least one exemplary implementation, when a similar block (such as block a4) is encountered, a similarity pointer, pS, is added in the position of the array 520 for the similar block a4. The pointer pS in the array 520 points to a metadata structure 560 which contains (i) a pointer p4 from pointers 540 to the corresponding unique block U2 in blocks 530, and (ii) a difference d4, from a set of differences 550 that should be applied to the unique block U2 to obtain a similar block (e.g., block a4 in the example of FIG. 5).

Figure 6A:
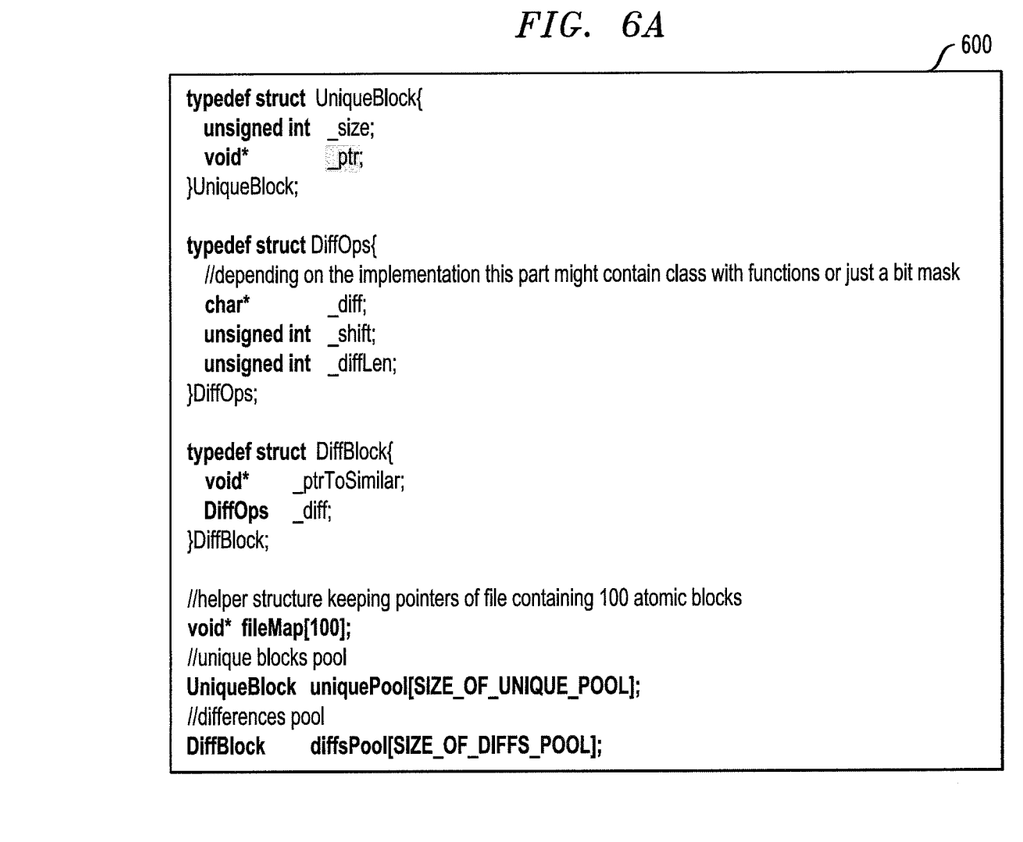
FIGS. 6A and 6B, collectively, illustrate exemplary pseudocode for an exemplary implementation of a block restore process that applies the restoration to an existing block.
Figure 6B:
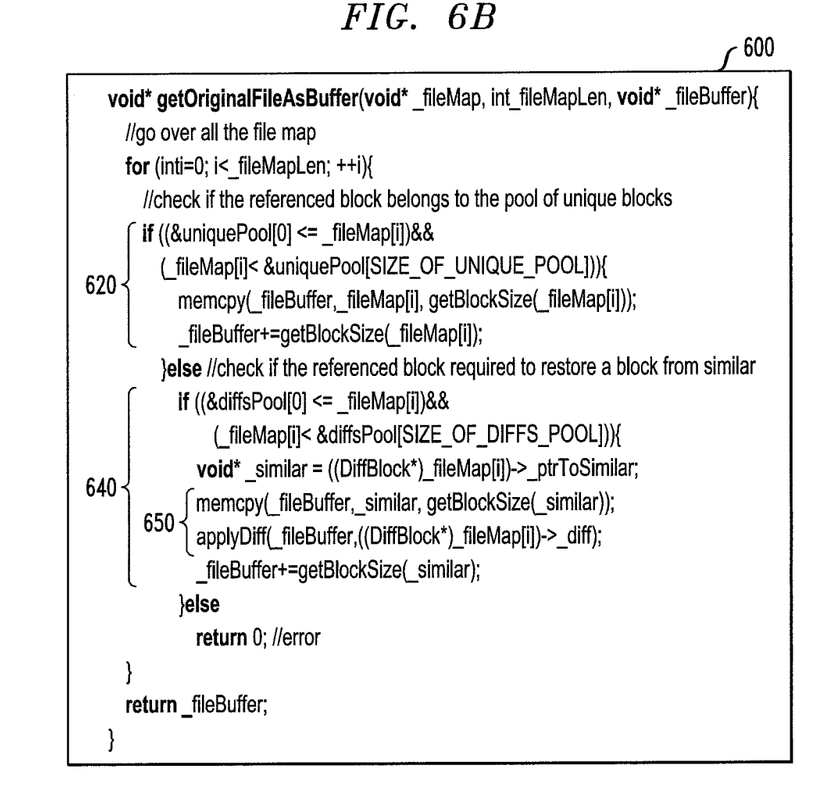

FIGS. 6A and 6B, collectively, illustrate exemplary pseudocode 600 for an exemplary implementation of a block restore process that applies the restoration to an existing block (from a buffer). As shown in FIG. 6A, data structures UniqueBlock and DiffOps are defined for storing unique blocks 530 and differences 550, respectively. A third data structure type 560, DiffBlock, is defined to store the metadata, comprised of a pointer 540 to a similar block in the UniqueBlocks 530 and a difference (DiffOps) 550. In this manner, if similar blocks are found, it is necessary to keep only the pointer 540 to the unique block and the differences 550 with respect to this block. Note that the difference might be either an executable code or mask.

As shown in FIG. 6B, the exemplary pseudocode 600 includes a code block 620 for restoring unique blocks and a code block 640 for restoring a block from a similar block using the metadata in the DiffBlock structure 550 (e.g., a pointer 540 to a similar block and a difference (DiffOps) 550). Code block 640 comprises two statements in section 650.

Figure 6C:
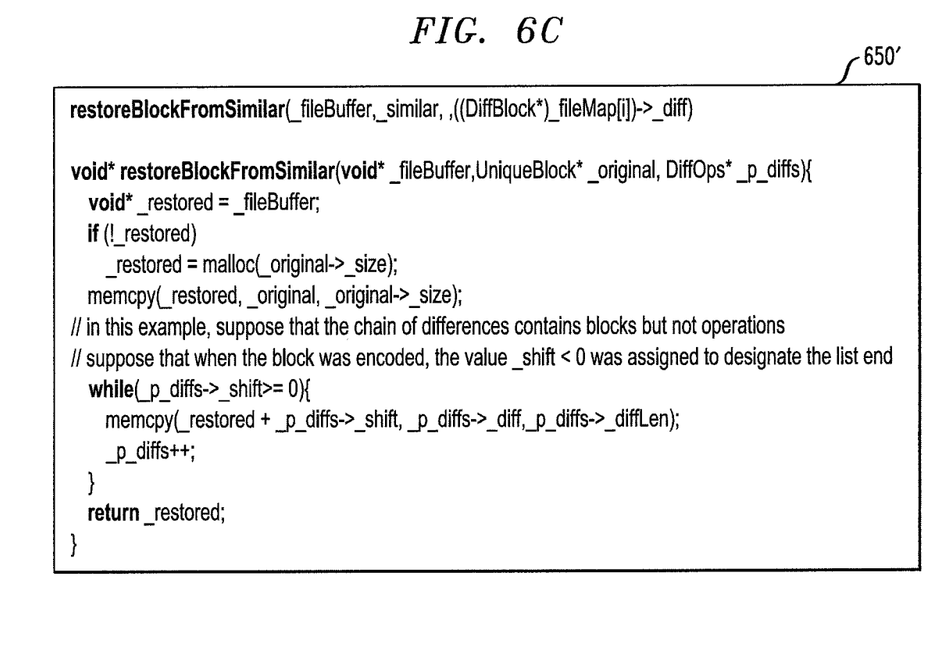
FIG. 6C illustrates an alternate implementation for a portion of FIG. 6B.

FIG. 6C illustrates an alternate implementation 650' for the two statements in section 650 of FIG. 6B.

Figure 7:
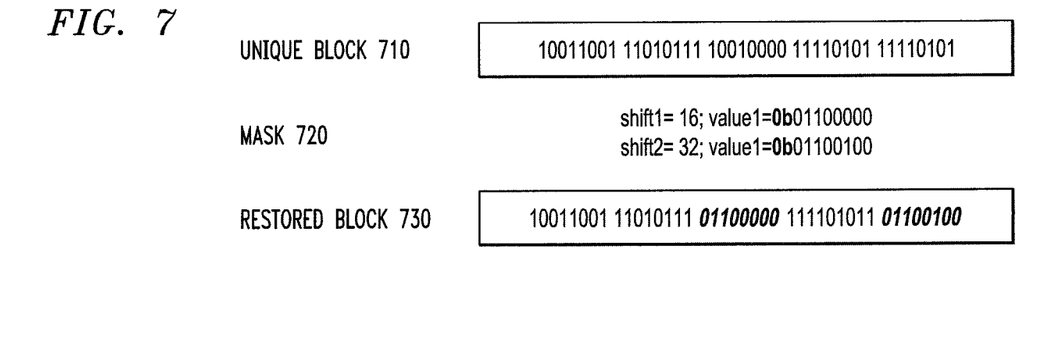
FIG. 7 illustrates a unique block and a mask that is applied to the unique block to generate a corresponding restored block.

FIG. 7 illustrates a unique block 710, a mask 720 that is applied to the unique block 710, and the corresponding restored block 730. The mask 710 is an exemplary implementation of the differences 550 in the metadata structure 560 of FIG. 5. As shown in FIG. 7, the mask 720 comprises a shift value indicating the position in the unique block 710 where a given mask value (e.g., value1) should be applied for block recovery.

Figure 8:
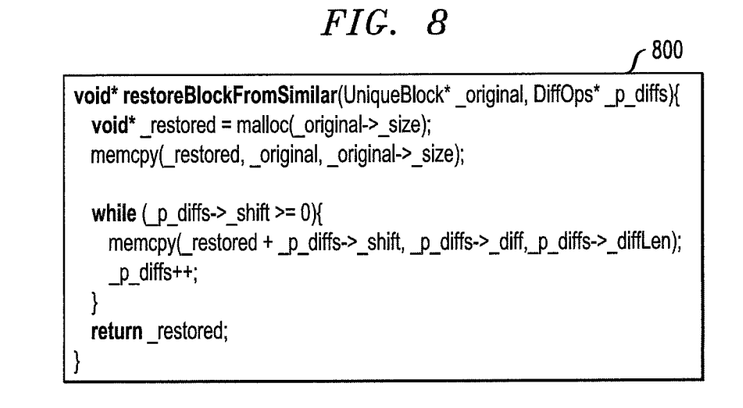
FIG. 8 illustrates exemplary pseudocode for an exemplary implementation of a block recovery process that recovers an original block by applying one or more masks of FIG. 7 to the appropriate unique block.

FIG. 8 illustrates exemplary pseudocode 800 for an exemplary implementation of a block recovery process that recovers an original block by applying one or more masks 720 of FIG. 7 to the appropriate unique block 710.

Figure 9:
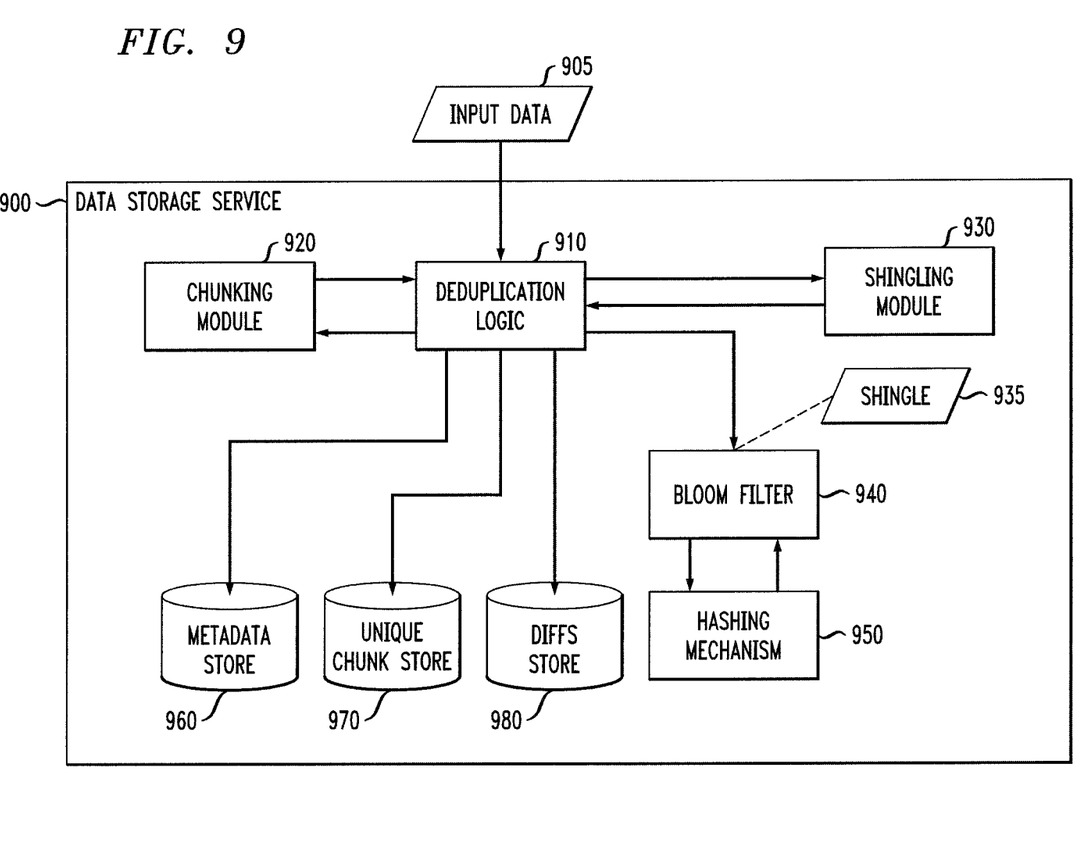
FIG. 9 is a block diagram of an exemplary data storage service employing one or more block similarity deduplication aspects described herein.

FIG. 9 is a block diagram of an exemplary data storage service 900 employing one or more block similarity deduplication aspects described herein. As shown in FIG. 9, the exemplary data storage service 900 receives input data 905 (e.g., flat file, blob data or the like), and deduplication logic 910 processes the input data 905 for deduplication.

The deduplication logic 910 provides the input data 905 to a chunking module 920, which splits the content of the input data 905 into chunks, in a known manner. Depending on the algorithm employed by the chunking module 920, the size might be fixed (for example, 8 Kbytes, 16 Kbytes, or 32 bytes) or dynamically varied based on content-aware algorithm.

The deduplication logic 910 passes every chunk from the chunking module 920 into a shingling module 930, where each chunk is split into shingles 935 (i.e., small bit sequences, such as about 64 bytes), in a known manner.

In the embodiment of FIG. 9, the shingles 935 are passed to a Bloom filter 940. The Bloom filter 940 is a probabilistic data structure that tests whether an element is a member of a set, in a known manner. Depending on the implementation of the Bloom filter 940, the Bloom filter 940 can employ, for example, a verity hashing mechanism 950. A verity hashing mechanism 950 can be implemented as a quick calculable weak hash function (e.g., a Rabin hash) that is computed at every small interval (mostly for each byte); or a strong hash function, e.g., a cryptographically secure SHA-1 hash function or the like. The exemplary SHA-1 hash function was designed by the United States National Security Agency and is a United States Federal Information Processing Standard published by the United States NIST. SHA-1 produces a 160-bit (20-byte) hash value, referred to as a message digest.

The fingerprint representation of a given chunk is used by the deduplication logic 910 to calculate differences between two respective chunks (a unique chunk and a compared chunk). Another implementation of the algorithm might use per bit comparison to find out the difference between blocks. The differences between the two respective chunks (delta) is used to estimate how close the compared (new) block is to a unique block. Depending on the result, the new block might be considered "unique" (if the differences exceed a predefined similarity threshold) or "similar" (if the differences do not exceed the predefined similarity threshold). The predefined similarity threshold that defines a similar block is optionally a tunable parameter. The size of the predefined threshold, however, should be set such that the supplementary structures 960, 980 should not exceed a predefined reasonable percentage of the block size.

In the case of a "unique" block, the new block is assigned to the pool of unique blocks 970. In the case of a "similar" block, the reference to the original block is stored in a metadata store 960 and the differences are stored in the differences (diffs) store 980.

Figure 10:
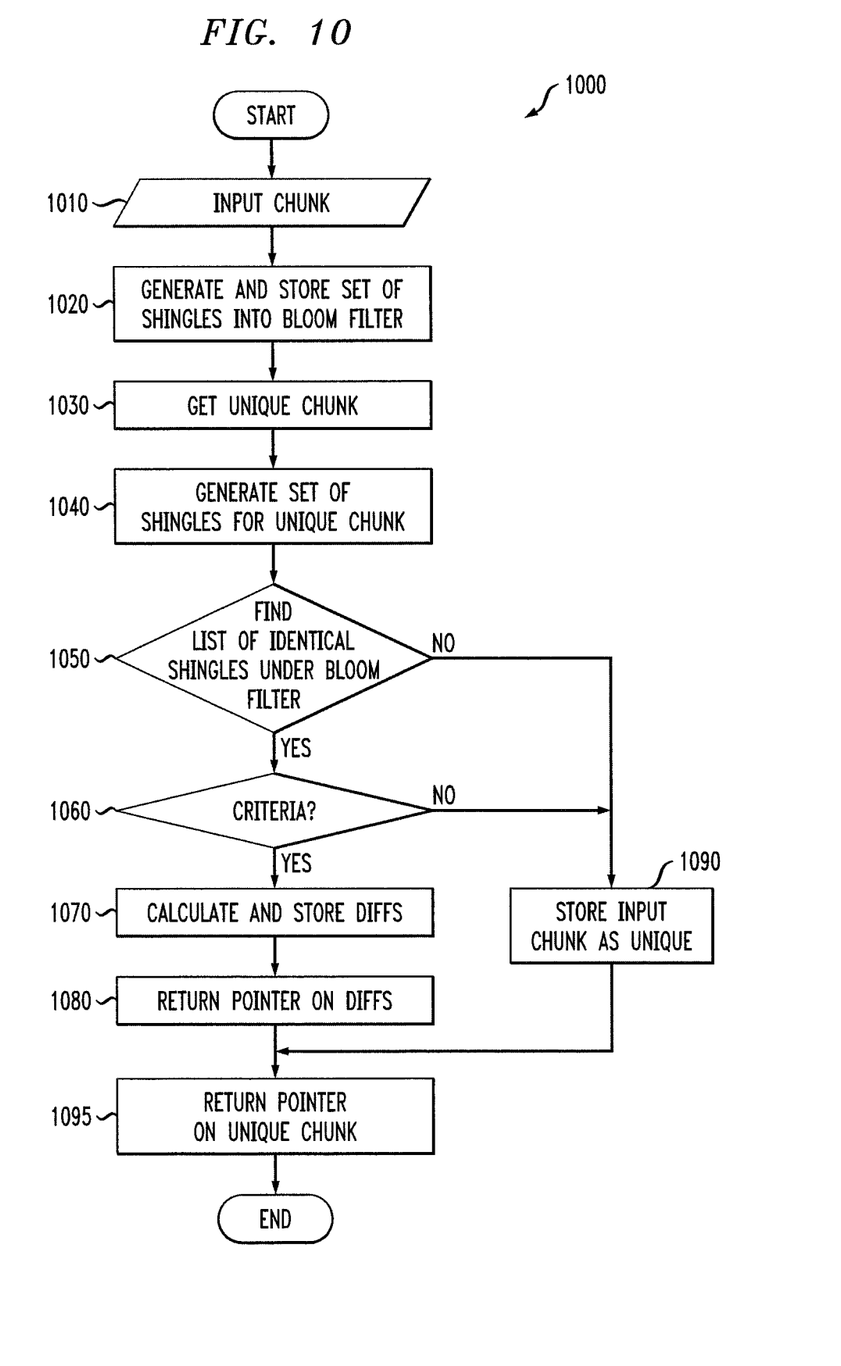
FIG. 10 is a flow chart illustrating an exemplary implementation of a similarity determination process that may be implemented by the exemplary data storage service of FIG. 9.

FIG. 10 is a flow chart illustrating an exemplary implementation of a similarity determination process 1000 that may be implemented by the exemplary data storage service 900 of FIG. 9 according to one embodiment of the invention. As shown in FIG. 10, the exemplary similarity determination process 1000 initially obtains an input chunk during step 1010. The exemplary similarity determination process 1000 then generates and stores a set of shingles 935 into the Bloom filter 940 during step 1020.

A unique chunk is obtained during step 1030 and a set of shingles is generated for the unique chunk during step 1040. A list of identical shingles is obtained from the Bloom filter 940 during step 1050. If no identical shingles are identified for the current chunk during step 1050, then the current chunk is stored as a unique chunk during step 1090.

If one or more identical shingles are identified for the current chunk during step 1050, then the predefined similarity criteria is considered during step 1060. If the predefined similarity criteria is not satisfied in step 1060, then the current chunk is stored as a unique chunk during step 1090.

If, however, the predefined similarity criteria is satisfied in step 1060, then the differences between the current chunk and the unique chunk are calculated and stored during step 1070. The pointer for the differences is returned during step 1080.

The pointer for the unique chunk is returned during step 1095.

CONCLUSION

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein. An article of manufacture, a computer program product or a computer readable storage medium, as used herein, is not to be construed as being transitory signals, such as electromagnetic waves.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 11:
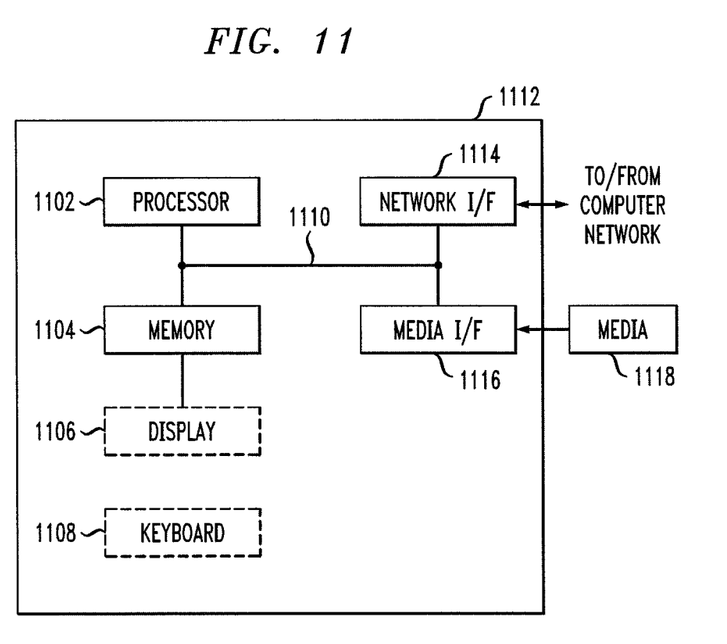
FIG. 11 is a system diagram of an exemplary computer system on which at least one embodiment of the invention can be implemented.

By way of example, an aspect of the present invention can make use of software running on a general purpose computer. FIG. 11 is a system diagram of an exemplary computer system on which at least one embodiment of the invention can be implemented. As depicted in FIG. 11, an example implementation employs, for example, a processor 1102, a memory 1104, and an input/output interface formed, for example, by a display 1106 and a keyboard 1108. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 1102, memory 1104, and input/output interface such as display 1106 and keyboard 1108 can be interconnected, for example, via bus 1110 as part of a data processing unit 1112. Suitable interconnections via bus 1110, can also be provided to a network interface 1114 (such as a network card), which can be provided to interface with a computer network, and to a media interface 1116 (such as a diskette or compact disc read-only memory (CD-ROM) drive), which can be provided to interface with media 1118.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 1102 coupled directly or indirectly to memory elements 1104 through a system bus 1110. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 1108, displays 1106, and pointing devices, can be coupled to the system either directly (such as via bus 1110) or through intervening I/O controllers.

Network adapters such as network interface 1114 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 1112 as depicted in FIG. 11) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by, or in connection with, an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, virtual hardware, software, or combinations thereof, for example, application specific integrated circuit(s) (ASICS), functional circuitry, one or more virtual machines in a virtual environment, or an appropriately programmed general purpose digital computer with associated memory.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems, storage systems and processing devices that can benefit from improved block similarity based block level deduplication of data. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising:
obtaining a block level deduplicated dataset comprising a plurality of unique data chunks;
determining a number of bit differences between two different ones of said unique data chunks;
evaluating whether said number of bit differences satisfies a predefined similarity criteria;
storing metadata for a first one of said two unique data chunks when said predefined similarity criteria is satisfied for said two different ones of said unique data chunks, wherein said metadata comprises a pointer to a second one of said two unique data chunks and said bit differences between said two unique data chunks; and
restoring said first one of said two unique data chunks by processing said metadata, wherein said restoring comprises: (i) obtaining the second one of said two unique data chunks based on said pointer and (ii) generating the restored first one of said two unique data chunks based on the obtained second one of said two unique data chunks and said bit differences.

2. The method of claim 1, wherein said determining step processes a fingerprint representation of said two unique data chunks to identify said differences.

3. The method of claim 1, wherein the predefined similarity criteria requires that said number of bit differences cannot exceed a specified limit.

4. The method of claim 1, wherein said bit differences are stored in a difference store.

5. The method of claim 1, wherein said bit differences comprise an executable code.

6. The method of claim 1, wherein the predefined similarity criteria comprises a predefined similarity threshold, and wherein said predefined similarity threshold is a tunable parameter.

7. The method of claim 1, wherein said bit differences comprise a bit mask.

8. A computer program product comprising a tangible machine-readable storage medium having encoded therein executable code of one or more software programs, wherein the one or more software programs when executed by at least one processing device perform the following steps:
   obtaining a block level deduplicated dataset comprising a plurality of unique data chunks;
   determining a number of bit differences between two of said unique data chunks;
   evaluating whether said number of differences satisfies a predefined similarity criteria;
   storing metadata for a first one of said two unique data chunks when said predefined similarity criteria is satisfied for said two different ones of said unique data chunks, wherein said metadata comprises a pointer to a second one of said two unique data chunks and said bit differences between said two unique data chunks; and
   restoring said first one of said two unique data chunks by processing said metadata, wherein said restoring comprises: (i) obtaining the second one of said two unique data chunks based on said pointer and (ii) generating the restored first one of said two unique data chunks based on the obtained second one of said two unique data chunks and said bit differences.

9. The computer program product of claim 8, wherein said determining step processes a fingerprint representation of said two unique data chunks to identify said differences.

10. The computer program product of claim 8, wherein the predefined similarity criteria requires that said number of bit differences cannot exceed a specified limit.

11. The computer program product of claim 8, wherein said bit differences comprise an executable code.

12. The computer program product of claim 8, wherein the predefined similarity criteria comprises a predefined similarity threshold, and wherein said predefined similarity threshold is a tunable parameter.

13. The computer program product of claim 8, wherein said bit differences comprise a bit mask.

14. A system, comprising:
   a memory; and
   at least one processing device, coupled to the memory, operative to implement the following steps:
   obtaining a block level deduplicated dataset comprising a plurality of unique data chunks;
   determining a number of bit differences between two of said unique data chunks;
   evaluating whether said number of differences satisfies a predefined similarity criteria;
   storing metadata for a first one of said two unique data chunks when said predefined similarity criteria is satisfied for said two unique data chunks, wherein said metadata comprises a pointer to a second one of said two unique data chunks and bit differences between said two unique data chunks; and
   restoring said first one of said two unique data chunks by processing said metadata, wherein said restoring comprises: (i) obtaining the second one of said two unique data chunks based on said pointer and (ii) generating the restored first one of said two unique data chunks based on the obtained second one of said two unique data chunks and said bit differences.

15. The system of claim 14, wherein said number of differences is determined by processing a fingerprint representation of said two unique data chunks to identify said differences.

16. The system of claim 14, wherein the predefined similarity criteria requires that said number of bit differences cannot exceed a specified limit.

17. The system of claim 14, wherein said bit differences are stored in a difference store.

18. The system of claim 14, wherein said bit differences comprise an executable code.

19. The system of claim 14, wherein the predefined similarity criteria comprises a predefined similarity threshold, and wherein said predefined similarity threshold is a tunable parameter.

20. The system of claim 14, wherein said bit differences comprise a bit mask.

* * * * *